United States Patent [19]

Billet

[11] Patent Number: 4,637,506

[45] Date of Patent: Jan. 20, 1987

[54] CLUTCH RELEASE BEARING AND ASSEMBLY TOOL FOR SAME

[75] Inventor: René Billet, Lamorlaye, France

[73] Assignee: Valeo, Paris, France

[21] Appl. No.: 616,277

[22] Filed: Jun. 1, 1984

[30] Foreign Application Priority Data

Jun. 2, 1983 [FR] France ................ 83 09145

[51] Int. Cl.⁴ .................. F16F 1/34; B25B 27/30
[52] U.S. Cl. ................ 192/110 B; 29/278; 267/161
[58] Field of Search .......... 192/98, 110 B; 29/280, 29/278; 267/158, 159, 161, 162, 163; 81/3 R

[56] References Cited

U.S. PATENT DOCUMENTS

| | | | |
|---|---|---|---|
| 2,357,139 | 8/1944 | Seme | 29/280 |
| 3,951,244 | 4/1976 | Neder | 192/98 |
| 4,117,916 | 10/1978 | Baker | 192/98 |
| 4,364,615 | 12/1982 | Euler | 267/161 X |
| 4,371,068 | 1/1983 | Billet | 192/98 |

Primary Examiner—Leonard E. Smith
Attorney, Agent, or Firm—Charles E. Brown; Charles A. Brown

[57] ABSTRACT

In a clutch release bearing suitable for automotive vehicles a drive member is retained to a maneuvering member in the axial direction by an axially acting spring washer. This bears on a first shoulder on the maneuvering member and urges the drive member in the axial direction towards a second shoulder on the maneuvering member. The first shoulder is locally intersected by at least one axially extending groove which is accessible from the outside, for the purpose of inserting an assembly tool.

11 Claims, 11 Drawing Figures

CLUTCH RELEASE BEARING AND ASSEMBLY TOOL FOR SAME

BACKGROUND OF THE INVENTION

1. Field of the invention

The present invention is generally concerned with clutch release bearings, that is to say the devices designed, in automotive vehicles in particular, to operate on the clutch release device of a clutch to command disengagement of the latter.

2. Description of the prior art

As is known, a clutch release bearing of this kind generally comprises a first member, commonly referred to as the maneuvering member, which is adapted to be acted on by a control member, in practice a clutch release yoke, and a second member, commonly referred to as the drive member, which is adapted to be acted on by the maneuvering member and to act on the clutch release device of the clutch to be operated, in addition to coupling means adapted to provide an appropriate axial connection between said drive member and said maneuvering member.

The present invention is more particularly directed to the situation in which these coupling means consist of an axially acting spring washer which, bearing on a first transverse shoulder provided for this purpose on the maneuvering member, urges the drive member in the axial direction towards a second transverse shoulder, facing the first in the axial direction, also formed for this purpose on said maneuvering member.

This is the case, for example, in at least some so-called self-centering clutch release bearings, that is to say at least certain clutch release bearings in which the drive member is free to move transversely in all directions relative to the maneuvering member, said drive member having an omnidirectional capacity for movement in contact with the second shoulder on said maneuvering member or a bearing member which bears on the latter in the axial direction, this second shoulder being formed, for example, by one side of a transverse flange on said maneuvering member or, inparticular when the latter also comprises an axial sleeve, by one side of a simple collar projecting radially from the sleeve all around same.

This is the case, even more specifically, with self-centering clutch release bearings in which the self-centering action is maintained, in which, when acted on by the appropriately specified axially acting spring washer, the drive member retains between two operations to disengage the clutch, its position relative to the maneuvering member which it occupies after the first such disengagement.

During the assembly of a clutch release bearing of this kind, which is effected by axial engagement of the drive member on the maneuvering member, the axially acting spring washer employed is usually inserted in advance into the drive member so that, as the latter is advanced, it moves along the axial sleeve of the maneuvering member, sliding over this sleeve as such progression advances.

For this axially acting spring washer to apply a predetermined axial load to the drive member when in service, there must be a specified axial distance between the points at which it bears on the maneuvering member and on the drive member.

This is the reason why there is usually provided a specific transverse shoulder adapted to such bearing engagement on the maneuvering member.

In practice, when the maneuvering member comprises an axial sleeve, as mentioned hereinabove, this shoulder is formed on the latter.

However, because of the sliding of the axially acting spring washer on this sleeve during engagement of the drive member on the maneuvering member, said axially acting spring washer is inevitably entrained relative to said sleeve during this engagement and there is thus, on completion of such engagement, an axial offset between the part of the axially acting spring washer concerned and the corresponding shoulder on said sleeve, said part being set back relative to said shoulder.

It is then usually necessary to employ a tool featuring an annular bush which is inserted for this purpose between the drive member and the sleeve of the maneuvering member, so as to press on the axially acting spring washer and push the latter back along said sleeve until it comes into engagement with the shoulder provided for it on the latter.

It is then necessary to provide sufficient annular space between the drive member and the sleeve of the maneuvering member for the insertion of a tool of this kind, which is prejudicial to the overall radial dimension of the assembly. In the radial direction, this space must be all the greater in that the bush of said tool must itself have sufficient thickness in the radial direction to have sufficient mechanical strength.

A general objective of the present invention is an arrangement offering the advantage of reducing this annular space without substantially reducing the mechanical strength of the tool to be employed.

SUMMARY OF THE INVENTION

The present invention consists firstly in a clutch release bearing comprising a maneuvering member adapted to be acted on by a control member, a drive member adapted to be acted on by said maneuvering member and to act on the clutch release device of a clutch, two transverse shoulders on said maneuvering member facing one another in the axial direction, and an axially acting spring washer adapted to retain said drive member to said maneuvering member in the axial direction, to bear on a first of said shoulders on said maneuvering member and to urge said drive member in the axial direction towards the second of said shoulders, wherein said first shoulder is locally intersected by at least one axial groove which is accessible from the outside.

In practice, the maneuvering member comprising an axial sleeve on which said first shoulder is formed, said at least one groove formed in the latter in accordance with the invention extends axially on the outside periphery of said sleeve from one end of the latter to said first shoulder.

In practice, several grooves are provided on the surface of said sleeve, being distributed circumferentially, and preferably regularly, around the axis of the assembly.

Be this as it may, by virtue of grooves of this kind, the depth of which in the radial direction is added to that of the annular gap between the drive member and the sleeve of the operating member, the tool to be employed for assembling the clutch release bearing in accordance with the invention may advantageously have locally increased thickness in the form of rod members.

Thus the present invention further consists in an assembly tool for a clutch release bearing in accordance with the invention as defined hereinabove, comprising at least one rod member adapted to engage in said at least one axial groove and of sufficient length to reach as far as said first shoulder.

In practice, the assembly tool in accordance with the invention comprises a plurality of parallel rod members distributed circumferentially, and preferably regularly, one for each groove on the maneuvering member of the clutch release bearing to be assembled, or more precisely on the sleeve which this maneuvering member usually comprises.

Other things being equal, it is thus and with advantage possible either to reduce the annular gap between the sleeve and the drive member, to the benefit of the overall radial dimension of the clutch release bearing concerned, or to locally reinforce the tool to be employed for assembling the clutch release bearing, to the benefit of its mechanical strength.

In a first possible embodiment of this assembly tool, the rod members which it comprises in accordance with the invention project from the inside surface of a bush, extending parallel to its axis.

Alternatively, in accordance with a further feature of the invention, the usable part of the assembly tool may, if required, comprise only individual rod members of this kind.

In this case, the annular gap left between the drive member and the sleeve of the maneuvering member of the clutch release bearing may itself be reduced, if reuired, to the value strictly necessary for the assembly and functioning of the clutch release bearing, independently of the tool to be used for its assembly.

Other objects and advantages will appear from the following description of an example of the invention, when considered in connection with the accompanying drawings, and the novel features will be particularly pointed out in the appended claims.

DESCRIPTION OF THE PREFERRED EMBODIMENTS

Figure 1:
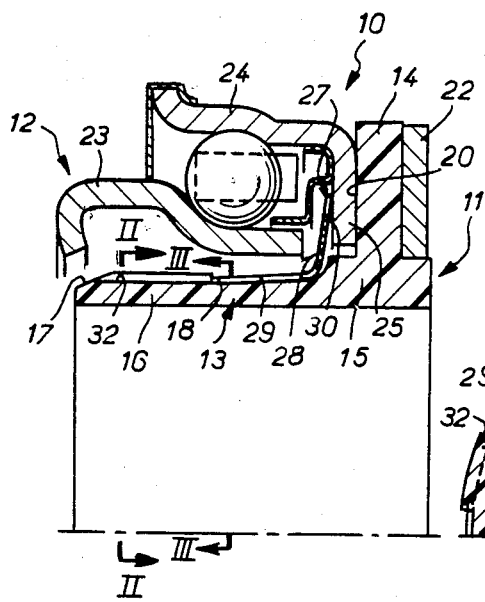
FIG. 1 is a half-view in axial cross-section of a clutch release bearing in accordance with the invention.
Figure 2:
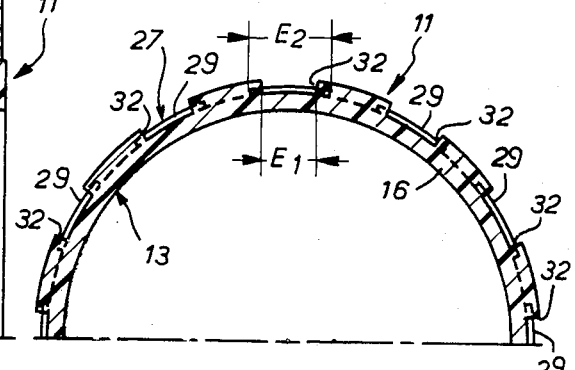
FIGS. 2 and 3 are partial views of it in transverse cross-section on the respective lines II—II and III—III in FIG. 1.
Figure 3:
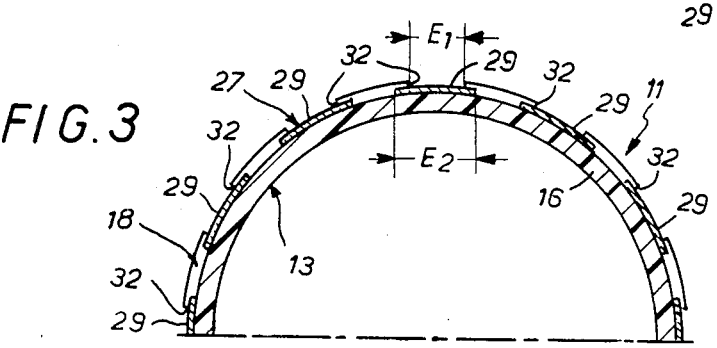

As shown in these figures, and in a manner which is known per se, the clutch release bearing 10 in accordance with the invention comprises a first member 11, commonly referred to as the maneuvering member, which is adapted to be acted on by a control member, in practice a clutch release yoke (not shown), and a second member 12, commonly referred to as the drive member, which is adapted to be acted on by the maneuvering member 11 and to act on the clutch release device of a clutch (also not shown).

In the embodiment shown, the maneuvering member 11 comprises an axial sleeve 13 and, at the end of said sleeve 13 opposite the drive member 12, a transverse flange 14.

In the embodiments shown, this flange 14, which projects in a generally radial direction from the outside suface of the sleeve 13, extends from the median part of a thicker section 15 of the end of the latter concerned.

The opposite end of the sleeve 13, and thus that on the same side as the drive member 12, also has a thicker portion 16, at the end of which is formed an outside chamfer 17.

Finally, the median part of the sleeve 13 comprises a first transverse shoulder 18 which, spaced from the flange 14, faces the latter in the axial direction and, in practice, delimits the aforementioned thicker portion 16 in the axial direction.

The side of the flange 14 facing said first shoulder 18 itself constitutes a second transverse shoulder 20.

In the embodiment shown in FIGS. 1 to 6, the sleeve 13 is smooth on the inside.

In the manner known per se, the thus constituted maneuvering member 10 may be of unitary construction, as shown here, being molded from any suitable synthetic material, for example.

In the embodiments shown, it is associated with a metal plate 22 referred to as the bearing plate, provided for the clutch release yoke to act on and disposed on and appropriately attached to the side of the flange 14 opposite the drive member 12.

As these arrangements are not relevant to the present invention and are well known per se, they will not be described in detail here.

In a manner also known per se, the drive member 12 is formed, in the embodiments shown, by a ball bearing of which the inner ring 23 is adapted to act on the clutch release device of the clutch to be operated and is appropriately shaped for this purpose and of which the outer ring 24 has a radial rim 25 directed radially towards the axis of the assembly and adapted to bear axially on the maneuvering member 11, more precisely on the transverse shoulder 20 which the flange 14 of the latter forms for this purpose.

As this is a self-centering clutch release bearing, radial clearance is provided between the drive member 12 and the sleeve of the maneuvering member 11; in the embodiments shown, this radial clearance is provided between the edge of the radial rim 25 of the drive member 12 and the thicker portion 15 of the sleeve 13 of the maneuvering member 11.

As this is a self-centering clutch release bearing in which the self-centering action is maintained, there is provided, in the manner known per se, an axially acting spring washer 27 for retaining the drive member 12 to the maneuvering member 11 in the axial direction. Bearing ont he first shoulder 18 of the maneuvering member 11, this spring washer 27 urges the drive member 12 axially towards the second shoulder 20 of the maneuvering member 11, bearing for this purpose in the axial direction on the radial rim 25 which the drive member 12 features for this purpose.

In the embodiments shown, and in the manner knwon per se, the axially acting spring washer 27 comprises a circumferentially continuous central part 28 and, on the inside perimeter of the latter, generally axial lugs 29 through the ends of which it bears on the first shoulder 18 of the maneuvering member 11 and, on the outside perimeter of said circumferentially continuous part 28, generally radial tangs 30 through which it bears on the radial rim 25 of the drive member 12.

As an axially acting spring washer 27 such as this does not of itself constitute an object of the present invention either, it will not be described in more detail here.

In accordance with the invention, the first shoulder 18 of the maneuvering member 11 is locally intersected by at least one groove 32 which extends axially and is accessible from the outside, from the same side as the drive member 12.

In practice, in the embodiments shown, a groove of this kind extends in the axial direction on the outside periphery of the sleeve 13 of the maneuvering member 11, more precisely of the thicker portion 16 of the latter, from the corresponding end of the sleeve 13, the chamfer 17 in this instance, to the first shoulder 18.

Thus, in the radial direction, its depth is added to that of the annular gap between the drive member 12 and the sleeve 13 of the maneuvering member 11.

Also in practice, in the embodiments shown, the groove 32 thus intersecting the first shoulder 18 of the maneuvering member 11 extends in the radial direction as far as the root of the latter, in other words, it is the same height as it in the radial direction, and there is thus distributed circumferentially around the axis of the assembly a plurality of grooves 32, equal in number to the axial lugs 29 on the associated axially acting spring washer 27.

For preference, and as shown here, these axial lugs 29 on the axially acting spring washer 27 and the grooves 32 in the maneuvering member 11 are regularly distributed in the circumferential direction around the axis of the assembly.

Be this as it may, the grooves 32 in the maneuvering member 11 are all of the same circumferential extent E1, the axial lugs 29 on the axially acting spring washer 27 all have the same circumferential extent E2 at their free end, and the circumferential extent E1 which said grooves 32 thus have is less than that E2 which said free ends of said axial lugs 29 also thus have.

As a result of this, in no case can the axial lugs 29 on the axially acting spring washer 27 engage in the grooves 32 in the maneuvering member 11, escaping from the transverse shoulder 18 of the letter, whatever the angular position of said axially acting spring washer 27 relative to the sleeve 13 of said maneuvering member 11.

Figure 4:
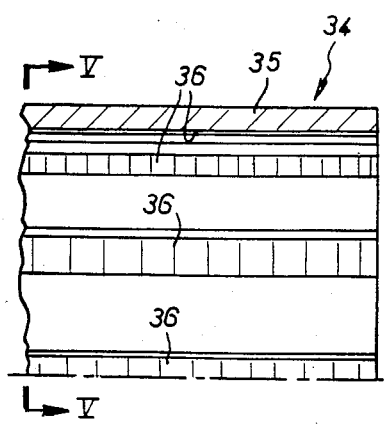
FIG. 4 is a half-view in axial cross-section of the operative part of a tool to be employed for assembling the clutch release bearing.
Figure 5:
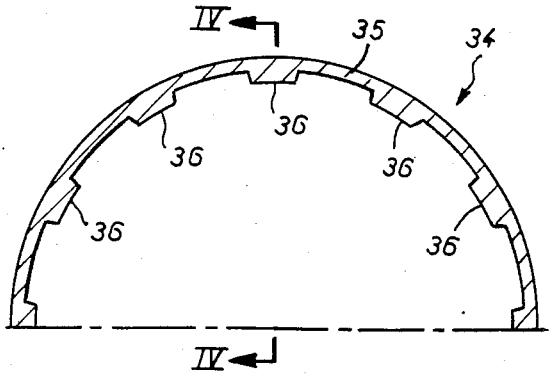
FIG. 5 is a partial view of it in transverse cross-section on the line V—V in FIG. 4.

In FIGS. 4 and 5 is schematically shown, in part, an assembly tool 34 adapted for the purpose of assembling the clutch release bearing 10 in accordance with the invention.

In a manner known per se, the operative part of this assembly tool 34 has, in the embodiment shown in FIGS. 4 and 5, a bush 35 appropriately supported on any form of gripping and manipulating handle (not shown).

The radial thickness of the bush 35 of this assembly tool 34 is sufficiently small for it to be inserted between the sleeve 13 of the maneuvering member 11 and the drive member 12.

In accordance with the invention, the assembly tool 34 further comprises at least one rod member 36 adapted to engage in one of the grooves 32 in the maneuvering member 11, said rod member being long enough to reach the first shoulder 17 of said maneuvering member 11.

In practice, a plurality of parallel rod members 36 of this kind projects from the inside surface of the bush 35, extending parallel to the axis of the latter and regularly distributed in the circumferential direction around said axis, one for each of the grooves 32 in the maneuvering member 11.

Figure 6A:
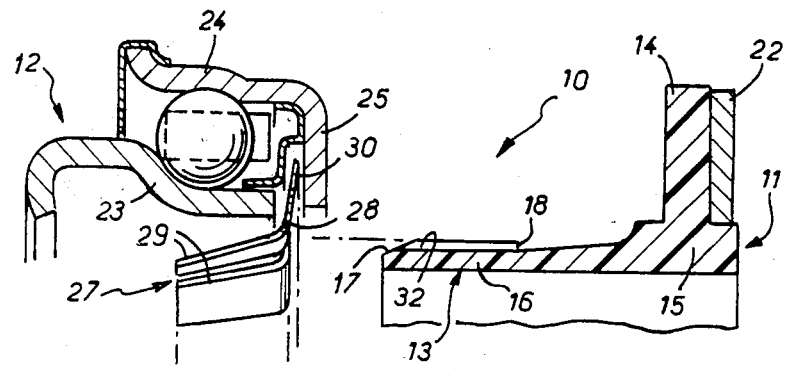
FIGS. 6A, 6B and 6C are partial views in axial cross-section illustrating various stages in the assembly of the clutch release bearing in accordance with the invention.

As shown by FIG. 6A, the axially acting spring washer 27 is positioned within the drive member 12 in advance, prior to axial engagement of the latter on the maneuvering member 11, with its circumferentially continuous part 28 and its tangs 30 disposed between the radial rim 25 on the outside ring 24 of the ball bearing constituting the drive member 12 and the corresponding edge of the inner ring 23 of the latter, its so-called axial lugs 29 being then in a rest configuration and generally oblique to the axis of the assembly.

Subsequently, on its axial engagement on the maneuvering member 11, the drive member 12 entrains with it the axially acting spring washer 27, engagement of the latter on the sleeve 13 of the maneuvering member 11 being facilitated by the chamfer 17 which the relevant end of the latter features for this purpose, implying deflection of its axial lugs 29.

Figure 6B:
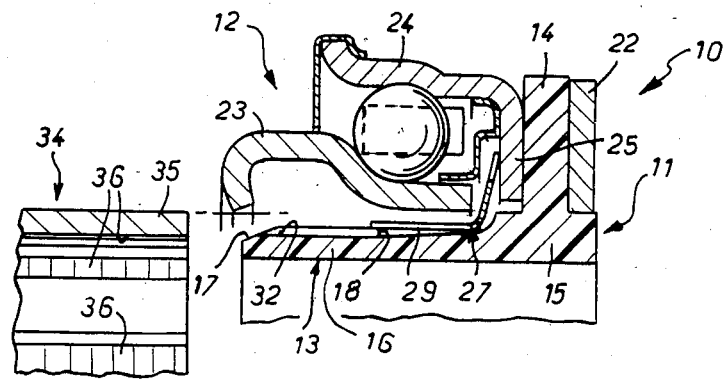

In practice, the axial engagement of the drive member 12 on the maneuvering member 11 is continued until the radial rim 25 of the drive member 12 butts up against the flange 14 of the maneuvering member 11 (FIG. 6B).

However, for the corresponding abutment position, the ends of the axial lugs 29 on the axially acting spring washer 27 are then axially spaced from the first shoulder 18 on the maneuvering member 11, rearwardly of the latter in the direction of axial engagement of the drive member 12 on said maneuvering member 11.

The assembly tool 34 is then used, being inserted between the sleeve 13 of the maneuvering member 11 and the drive member 12, with its rod members 36 engaged in the grooves 32 in said maneuvering member 11.

Figure 6C:
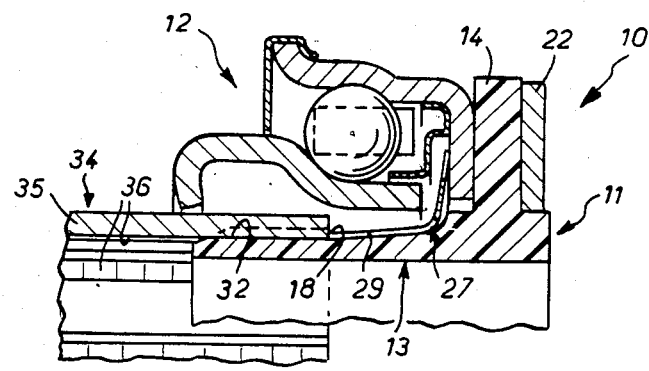

The assembly tool 34 is inserted until, its edge coming into contact with the ends of the axial lugs 29 of the axially acting spring washer 27, it can push said axial lugs 29 to a position in line with the first shoulder 18 of the maneuvering member 11 (FIG. 6C).

Because of their elasticity, the axial lugs 29 of the axially acting spring washer 27 then tend to close over the corresponding portion of the sleeve 13 of the maneuvering member 11, in the direction towards the axis of the assembly, so that their ends engage on the first shoulder 18 on the latter, as is intended.

Figure 7:
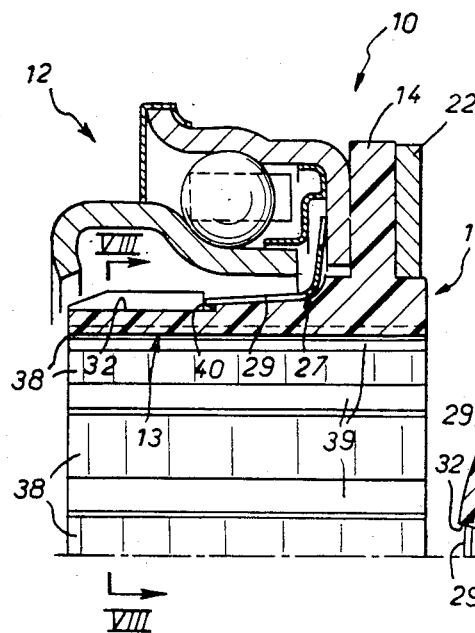
FIGS. 7 and 8 are views respectively analogous to those of FIGS. 1 and 2 and concerning an alternative embodiment of the clutch release bearing in accordance with the invention.
Figure 8:
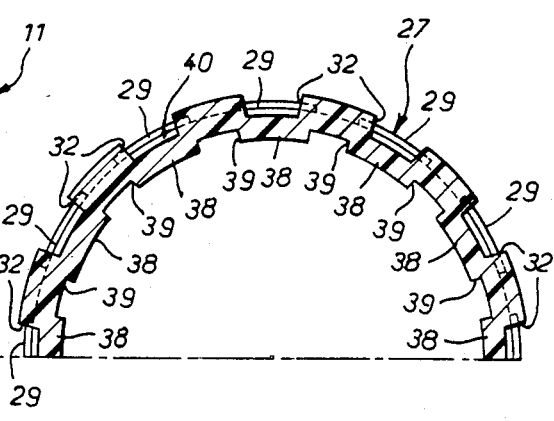

In the embodiment shown in FIGS. 7 and 8, instead of being smooth on the inside the sleeve 13 of the maneuvering member 11 comprises, in a manner which is known per se and for reasons which are specific to its function, splines 38 projecting from its inside perimeter in the radial direction and extending along it in the axial direction.

In this case, the grooves 32 which it features in accordance with the invention, which are formed in its outside peripheral surface, are preferably radially aligned with said internal splines 38, alternating with the internal grooves 39 between two of the latter, as shown here, with the advantage that sufficient thickness is retained at all points for a given overall thickness.

Also, in this embodiment, the internal splines 38 which the sleeve 13 of the maneuvering member 11 thus features are exploited in order to deepen the grooves 32.

In other words, in this embodiment, these have a radial height which is greater than that which they have in the preceding embodiment.

It results from this that the maneuvering member 11, or more precisely the sleeve 13 thereof, comprises a third transverse shoulder 40 between its first shoulder 18 and its second shoulder 20. This, like the second shoulder 20, faces the first shoulder 18 in the axial direction and is of less height in the radial direction than the latter.

In the embodiment shown, this third shoulder 40 is spaced from the first shoulder 18, although in its immediate vicinity.

However, it goes without saying that it could be coincident therewith in the transverse direction.

Figure 9:
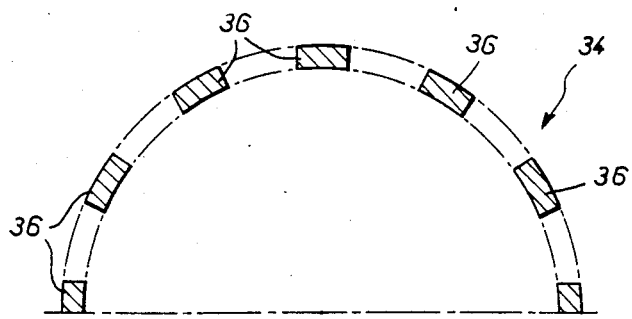
FIG. 9 is a view analogous to that of FIG. 5 and concerning an alternative embodiment of the corresponding assembly tool.

Be this as it may, in this case the assembly tool 34 need not comprise any bush, its operative part being then reduced to only the rod members 36, as shown schematically in FIG. 9, since these may then themselves have sufficient thickness in the radial direction to confer the necessary mechanical strength, given the increased depth of the corresponding grooves 32.

It will be understood that various changes in the details, materials and arrangements of parts, which have been herein described and illustrated in order to explain the nature of the invention, may be made by those skilled in the art within the principle and scope of the invention as expressed in the appended claims.

For example, the maneuvering member of the clutch release bearing may feature any number of grooves, although this number is preferably at least three.

I claim:

1. Assembly tool for assembling a clutch release bearing of the type comprising a maneuvering member adapted to be acted on by a control member, a drive member responsive to the maneuvering member to operate the clutch release device of a clutch, two transverse shoulders on the maneuvering member facing each other in the axial direction and an axially acting spring washer for retaining the drive member to the maneuvering member in the axial direction to bear on a first of the shoulders on the maneuvering member and to bias the drive member in the axial direction against a second of the shoulders, the spring washer having axial lugs with free ends for bearing on the first shoulder, and circumferentially spaced axial grooves extending through the first shoulder and accessible from the end of the maneuvering member remote from the second shoulder; said assembly tool being of unitary construction and annular configuration and comprising circumferentially spaced axial rib means for sliding movement in the axial grooves of a clutch release bearing maneuvering member to engage free ends of the axial lugs of a clutch release bearing spring washer to flex the lugs over the first shoulder of a clutch release bearing maneuvering member and into axial abutment with the first shoulder.

2. Assembly tool according to claim 1, said assembly tool defining a bush and wherein said rib means project from the inside perimeter of said bush and parallel to the axis thereof.

3. Assembly tool according to claim 1, wherein said rib means are equally circumferentially spaced from one another.

4. clutch release bearing comprising a maneuvering member to be acted on by a control member, a drive member responsive to said maneuvering member to operate a clutch release device of a clutch, two transverse shoulders on said maneuvering member facing each other in the axial direction, and an axially acting spring washer retaining said drive member to said maneuvering member in the axial direction, said spring washer bearing on a first of said shoulders on said maneuvering member to bias said drive member in the axial direction against a second of said shoulders, said spring washer ahving circumferentially spaced axially extending lugs engageable with said first shoulder, circumferentially spaced axial grooves extending through said first shoulder and accessible from the end of said maneuvering member axially remote from said second shoulder.

5. Clutch release bearing according to claim 4, wherein said maneuvering member comprises an axial sleeve on which is formed said first shoulder, and said axial grooves being on the outside of said sleeve from the end of said sleeve remote from said second shoulder to said first shoulder.

6. Clutch release bearing according to claim 5, wherein said sleeve has radial splines on its inside surface which extend parallel to the axis of said sleeve and wherein said grooves are radially aligned with said splines.

7. Clutch release bearing according to claim 4, wherein said grooves intersecting said first shoulder of said maneuvering member extend radially to the root of said first shoulder.

8. Clutch release bearing according to claim 4, wherein said axial lugs have free ends, and said maneuvering member has a third shoulder between said first and second shoulders which faces said first shoulder in the axial direction and is of smaller radial height than the latter, so that said free ends of said axial lugs engage said first shoulder radially intermediately of said first shoulder.

9. Clutch release bearing according to claim 4, wherein said grooves are regularly circumferentially spaced.

10. Clutch release bearing according to claim 4, wherein said sleeve has radial splines on its inside surface which extend parallel to its axis, each of said axial grooves being radially aligned with one of said splines, and said axial grooves on the outside surface of said sleeve alternating with gaps between adjacent splines on the inside surface of said sleeve.

11. Clutch release bearing according to claim 4, and an assembly tool for assembling the drive member and spring washer on the maneuvering member, said tool being of unitary construction and annular configuration and comprising circumferentially spaced axial rib means slidable in said axial grooves to engage free ends of said axial lugs to flex said lugs over said first shoulder and into axial abutment with said first shoulder.

* * * * *